US012055008B2

(12) United States Patent
Glaesman et al.

(10) Patent No.: US 12,055,008 B2
(45) Date of Patent: Aug. 6, 2024

(54) LATTICE FORMATION OF THERMOPLASTIC MATERIALS TO MODEL ELASTIC BEHAVIOR

(71) Applicant: Halliburton Energy Services, Inc., Houston, TX (US)

(72) Inventors: Chad William Glaesman, McKinney, TX (US); Timothy Alan Freeney, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/622,374

(22) PCT Filed: Mar. 28, 2019

(86) PCT No.: PCT/US2019/024577
§ 371 (c)(1),
(2) Date: Dec. 13, 2019

(87) PCT Pub. No.: WO2020/197560
PCT Pub. Date: Oct. 1, 2020

(65) Prior Publication Data
US 2022/0049571 A1    Feb. 17, 2022

(51) Int. Cl.
*F16J 15/02*         (2006.01)
*B33Y 80/00*         (2015.01)
(Continued)

(52) U.S. Cl.
CPC .......... *E21B 33/1208* (2013.01); *B33Y 80/00* (2014.12); *F16J 15/024* (2013.01);
(Continued)

(58) Field of Classification Search
CPC ..... E21B 33/1208; B33Y 80/00; F16J 15/024; F16J 15/102; F16J 15/104; F16J 15/18; F16J 15/181; F16J 15/20
See application file for complete search history.

(56) References Cited

U.S. PATENT DOCUMENTS

| | | |
|---|---|---|
| 5,615,896 A | 4/1997 | Morvant |
| 2002/0074742 A1 | 6/2002 | Quoiani |

(Continued)

FOREIGN PATENT DOCUMENTS

| | | | |
|---|---|---|---|
| GB | 922131 A | 3/1963 | |
| WO | WO 2010/127240 A1 | 11/2010 | |
| WO | WO-2016133498 A1 * | 8/2016 | ......... E21B 33/1208 |

OTHER PUBLICATIONS

Search Report and Written Opinion issued for International Patent Application No. PCT/US2019/024577, dated Dec. 26, 2019, 13 pages.

(Continued)

*Primary Examiner* — Gilbert Y Lee
(74) *Attorney, Agent, or Firm* — DeLizio, Peacock, Lewin & Guerra, LLP

(57) ABSTRACT

A sealing assembly for use in a wellbore tool includes thermoplastic materials arranged in a lattice structure to provide a bulk elasticity on the order of elastomeric materials. The lattice structure permits an energizing element of the sealing assembly to deform sufficiently in the elastic range of the thermoplastic materials to provide repeatable sealing capabilities. The lattice structure may be constructed by additive manufacturing processes to include voids therein, which allow the thermoplastic members of the lattice to flex and bend. The energizing element may thereby exhibit a greater elasticity in bulk than the elasticity of the thermoplastic materials themselves. The lattice structure may be enclosed in an outer cover constructed of a poly- (Continued)

meric, elastomeric or other material to facilitate the interaction between the seal assembly and the corresponding sealing surfaces of a downhole wellbore tool.

20 Claims, 7 Drawing Sheets

(51) Int. Cl.
    *E21B 33/12*     (2006.01)
    *F16J 15/10*     (2006.01)
    *F16J 15/18*     (2006.01)

(52) U.S. Cl.
    CPC ........... *F16J 15/102* (2013.01); *F16J 15/104* (2013.01); *F16J 15/18* (2013.01)

(56) References Cited

U.S. PATENT DOCUMENTS

2010/0219592 A1    9/2010   Tuckness et al.
2017/0342797 A1   11/2017   Murphree et al.
2020/0199966 A1*   6/2020   Napier ................... B33Y 80/00

OTHER PUBLICATIONS

CA Application No. 3,124,473 Office Action, Oct. 5, 2022, 4 pages.

* cited by examiner

LATTICE FORMATION OF THERMOPLASTIC MATERIALS TO MODEL ELASTIC BEHAVIOR

CROSS REFERENCE TO RELATED APPLICATIONS

The present application is a U.S. National Stage patent application of International Patent Application No. PCT/US2019/024577, filed on Mar. 28, 2019, the benefit of which is claimed and the disclosure of which is incorporated herein by reference in its entirety.

BACKGROUND

The present disclosure relates generally to equipment and operations for use in a subterranean wellbore. Example embodiments described herein include seal elements and assemblies constructed with thermoplastic materials arranged to mimic the elastic capabilities of elastomeric materials while providing the chemical stability and other characteristics of the thermoplastic materials.

Wellbores are often drilled through subterranean geologic formations for hydrocarbon exploration and recovery. During drilling and production operations, extreme and dynamic environmental conditions are often encountered downhole, e.g., rapid decompression and high-temperature gasses. The high-temperature gasses or other fluids present in the wellbore may also be chemically corrosive or otherwise caustic. Therefore, the downhole environment can be hazardous to the equipment placed downhole, and the useful life of the equipment may be limited. Wellbore systems may include multiple segments of tubing, valves, and connectors that are sealed together by various seal elements and assemblies. Many of these seal elements are constructed of a metal or an elastomer. Metal seals provide long-term resistance to wellbore fluids, temperatures and pressures, but often rely on high installation forces and complicated design and geometry to provide reliable sealing. Elastomeric seals typically have a simple design that can be installed with low installation forces. Further, elastomeric seals may provide a seal across imperfections (e.g., damage, concentricity and ovalities) on sealing surfaces, and have larger manufacturing tolerances, concentricity and ovalities allowances. Elastomeric seals are generally formed from a single elastomer that is designed for use in a particular environment. For example, an electrometric seal including specific material may be employed based on the seal's anticipated operating temperature, pressure and chemical exposure. Accordingly, the electrometric seal is often limited to use in a given range of pressures, temperatures, surrounding chemicals.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure describes a sealing assembly that includes thermoplastic materials arranged in a lattice structure to provide bulk properties, e.g., elasticity, on the order of elastomeric materials. The thermoplastic materials provide chemical and temperature resistance, and the lattice structure permits the sealing assembly to deform sufficiently in the elastic range of the thermoplastic materials to provide repeatable the sealing capabilities. The lattice structure may be constructed by additive manufacturing, dispersing microglass spheres into a thermoplastic material, incorporating blowing agents, or other techniques. The lattice structure may be enclosed in an outer cover constructed of a polymeric, elastomeric or other material to facilitate the interaction between the seal assembly and the corresponding sealing surfaces of a downhole wellbore tool.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the invention.

Figure 1:
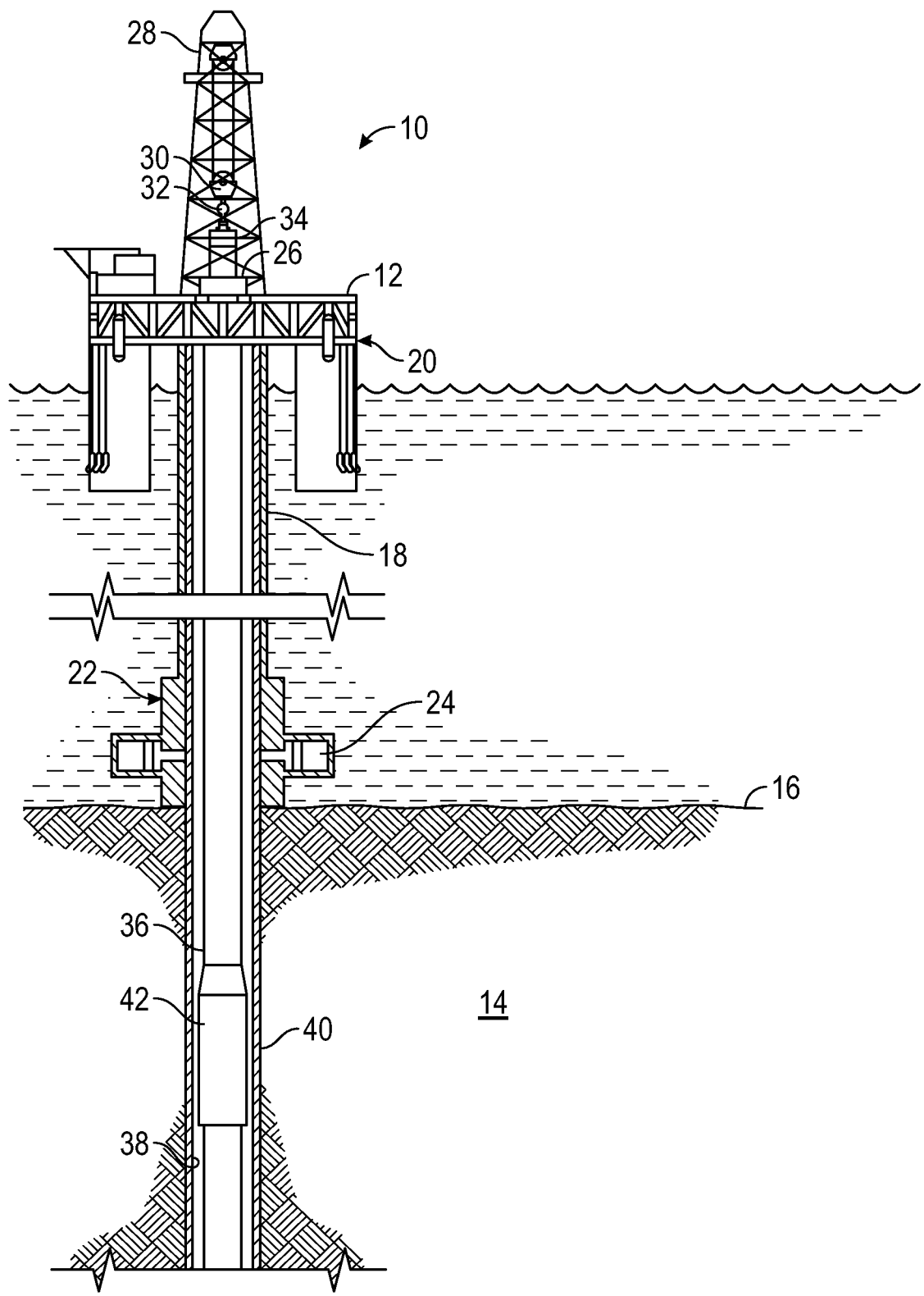
FIG. 1 is a partial, cross-sectional side view of an offshore wellbore system employing seal assemblies in accordance with principles of the present disclosure.

Referring to FIG. 1, an exemplary embodiment of an offshore oil and gas platform is schematically illustrated and generally designated by the reference numeral 10. The offshore oil and gas platform 10 includes a semi-submersible platform 12 that is positioned over a submerged oil and gas formation 14 located below a sea floor 16. A subsea conduit 18 extends from a deck 20 of the platform 12 to a subsea wellhead installation 22. One or more pressure control devices 24, such as, for example, blowout preventers (BOPs), and/or other equipment associated with drilling or producing a wellbore may be provided at the subsea wellhead installation 22 or elsewhere in the system. The platform 12 may include a hoisting apparatus 26, a derrick 28, a travel block 30, a hook 32, and a swivel 34, which components are together operable for raising and lowering a conveyance vehicle 36.

A variety of conveyance vehicles 36 may be raised and lowered from the platform 12, such as, for example, casing, drill pipe, coiled tubing, production tubing, other types of pipe or tubing strings, and/or other types of conveyance vehicles, such as wireline, slickline, and the like. In the embodiment of FIG. 1, the conveyance vehicle 36 is a substantially tubular, axially extending tubular string made up of a plurality of pipe joints coupled to one another end-to-end.

The platform 12 may also include a kelly, a rotary table, a top drive unit, and/or other equipment associated with the rotation and/or translation of the conveyance vehicle 36. A wellbore 38 extends from the subsea wellhead installation 22 and through the various earth strata, including the formation 14. At least a portion of the wellbore 38 may include a casing string 40 cemented therein. Connected to the conveyance vehicle 36 and extending within the wellbore 38 is a wellbore tool 42 in which a seal assembly 100 (see, e.g., FIG. 3A) for high pressure, high temperature (HPHT) applications of the present disclosure is be incorporated.

Although the wellbore tool 42 is illustrated in connection with offshore oil and gas platform 10, the wellbore tool 42 may be employed in other downhole environments without departing from the scope of the disclosure. For example, a wellbore tool 42 may be employed in terrestrial-based wellbores, horizontal, deviated and/or lateral wellbores in cased and open-hole portions, and the wellbore tool 42 may be useful in performing production, drilling and exploration operations.

Figure 2A:
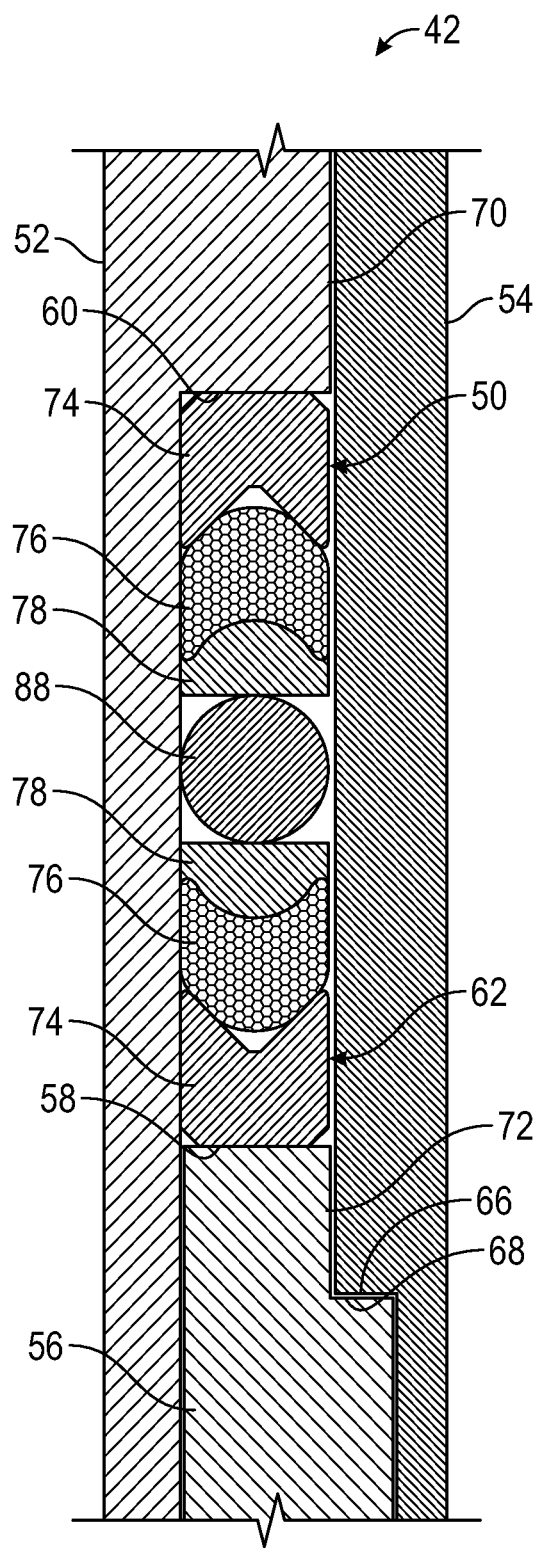
FIGS. 2A and 2B are cross-sectional views of a sealing assembly including an elastomeric sealing element and associated backup systems in respective resting and energized configurations installed between two wellbore tubulars.

Referring to FIG. 2A, a portion of the wellbore tool 42 is depicted that includes a sealing assembly 50 positioned between cooperating tubular members 52, 54 and arranged in a resting or unactuated position. A first tubular member 52 may be operably associated with a tubular section 56, which may be threadably coupled to first tubular member 52 or otherwise fixed relative thereto. Tubular section 56 includes an upwardly facing shoulder 58, which opposes a downwardly facing shoulder 60 of the first tubular member 52. A gland groove 62 is defined between the shoulders 58, 60, which houses the sealing assembly 50. In some embodiments, the first tubular member 52 and tubular section 56 may be adjacent components of the wellbore tool 42 as illustrated, or in other embodiments, the first tubular member 52 and tubular section 56 may be consecutively disposed pipe joints of the conveyance vehicle 36 (FIG. 1) within the interior of the conveyance vehicle 36 or other tubular string.

Second tubular member 54 is disposed adjacent the first tubular member 52 and the tubular section 56. The second tubular member 54 includes a shoulder 66 that interfaces with a corresponding shoulder 68 of the tubular section 56 to define an axial position between the first and second tubular members 52, 54.

In some embodiments, the second tubular member 54 may be a component of the wellbore tool 42 that is held stationary with respect to the first tubular member 52 in operation, or a component arranged to be inserted downhole within the first tubular member 52 to rest on the shoulder 68 of the tubular section 56. As illustrated, a clearance gap 70 exists between the first and second tubular members 52, 54 and a clearance gap 72 exists between the tubular section 56 and the second tubular member 54. The clearance gaps 70, 72 allow for the insertion and removal of second tubular member 54 from first tubular member 52 and tubular section 56 with minimal resistance and without damage to sealing assembly 50.

Sealing assembly 50 includes a pair of oppositely disposed annular adaptor members 74 disposed adjacent shoulders 58, 60 and are sized to fit radially within the gland groove 62. The adaptor members 74 may be constructed from rigid materials including plastics, composites or metals. Nested axially within the adaptor members 74 is a pair of oppositely disposed backup rings 76. Backup rings 76 are also sized to fit radially within the gland groove 62 and may be constructed of polymers such as a thermoplastic, e.g., polyetheretherketone (PEEK), an elastomer including ethylene propylene diene monomer (EPDM) or a fluoropolymer including polytetrafluoroethylene (PTFE). In certain high temperature applications including steam applications, backup rings 76 may be constructed from flexible graphite composites. Nested axially within the backup rings 76, sealing assembly 50 includes a pair of oppositely disposed cap rings 78, depicted in the form of extended D-rings. Cap rings 78 may be constructed from a rigid material including plastics, composites or metals. The annular adaptor members 74, backup rings 76 and cap rings 78 may exhibit alternate geometries, e.g., D-type V-type, rectangular cross sections, etc., or may be omitted entirely without departing from the scope of the present disclosure.

Sealing assembly 50 includes an energizing element 88 depicted as O-ring seal positioned between cap rings 78. Energizing element 88 is sized to fit within gland groove 62. The energizing element 88 may be constructed of an elastomer such as a synthetic rubber, a butadiene rubber (BR), a nitrile rubber (NBR), a fluoroelastomer (FKM), a perfluoroelastomer (FFKM) or other thermoset material. In some embodiments, e.g., for steam or other high temperature applications, the energizing element 88 may be constructed of an ethylene propylene diene monomer (EPDM). In some embodiments, the energizing element 88 may be constructed of dense thermoplastic vulcanizates (TPV) or thermoplastic elastomers (TPE). Other materials could alternatively be used to form energizing element, and the materials may be selected based upon factors such as chemical compatibility, application temperature, sealing pressure and the like. In addition, even though the energizing element 88 has been depicted as an O-ring with a generally circular cross section, in other embodiments, the energizing element 88 could have alternate configurations, including, but not limited to, quad rings, square block seals, beta seals and the like, which allow the energizing element 88 to energize sealing assembly 50 when sufficient pressure is applied thereto and which allow the energizing element 88 to engage in controlled wedging into the extrusion gaps 90 (see FIG. 2B) defined within the gland groove 62.

The sealing assembly 50 operates to prevent the transmission of pressure between a region defined above and including clearance gap 70 and a region defined below and including clearance gap 72. The sealing assembly 50 is bidirectional and prevents the transmission of pressure between the two regions regardless of which region is exhibits the higher pressure. The sealing assembly 50 is generally symmetrical about a horizontal axis extending through the energizing element 88. In other embodiments, the sizes, shapes and materials of the adaptor members 74, backup rings 76, caps rings 78 and energizing element 88 may vary to accommodate particular pressures, environments or specific applications.

In the embodiment illustrated in FIG. 2B, the pressure in the region below clearance gap 72 is higher than the pressure in the region above clearance gap 70. Accordingly, sealing assembly 50 is in an energized or actuated configuration wherein an upper portion of sealing assembly 50 provides a seal between the first and second tubular members 52, 54 that prevents pressure from escaping from the region below the clearance gap 72 into the region above clearance gap 70. As illustrated, the pressure has caused energizing element 88 to become compressed against the cap ring 78. The force acting on the energizing element 88 compresses the energizing element 88 longitudinally while expanding the energizing element 88 radially.

Similarly, the force from the pressure on the upper cap ring 78 presses the cap ring 78 into backup ring 76 and likewise presses backup ring 76 into adaptor member 74.

The interaction between the cap ring 78 and backup ring 76 as well as the interaction between adaptor member 74 and backup ring 76 causes the backup ring 76 to be energized resulting in longitudinal compression and radial expansion of backup ring 76. The energized backup ring 76 and energizing element 88 establishes a seal against first and second tubular members 52, 54.

Under sufficient pressure, the energizing element 88 extrudes into extrusion gaps 90 on radial sides of the cap ring 78. Accordingly, the elasticity and other bulk characteristics of the energizing element 88 may be configured to allow a desirable amount of extrusion to assure a complete seal. The use of backup ring 76 may establish a barrier to additional or excessive extrusion of the energizing element 88 when backup ring 76 are is also energized to extrude into the extrusion gaps 90. In some downhole applications, the sealing assembly 50 may be subject to rapid decompression of high-pressure gasses in either the region above clearance gap 70 or the region below the clearance gap 72. This rapid decompression may cause the energizing element 88 (and/or backup ring 76) to be permanently deformed as the elastic capacity of the elastomeric materials may be exceeded. Mechanical damage and splitting of the softer elastomeric and/or thermoset seals such as energizing element 88 and backup ring 76 have been observed when subject to rapid gas decompression.

Figure 2B:
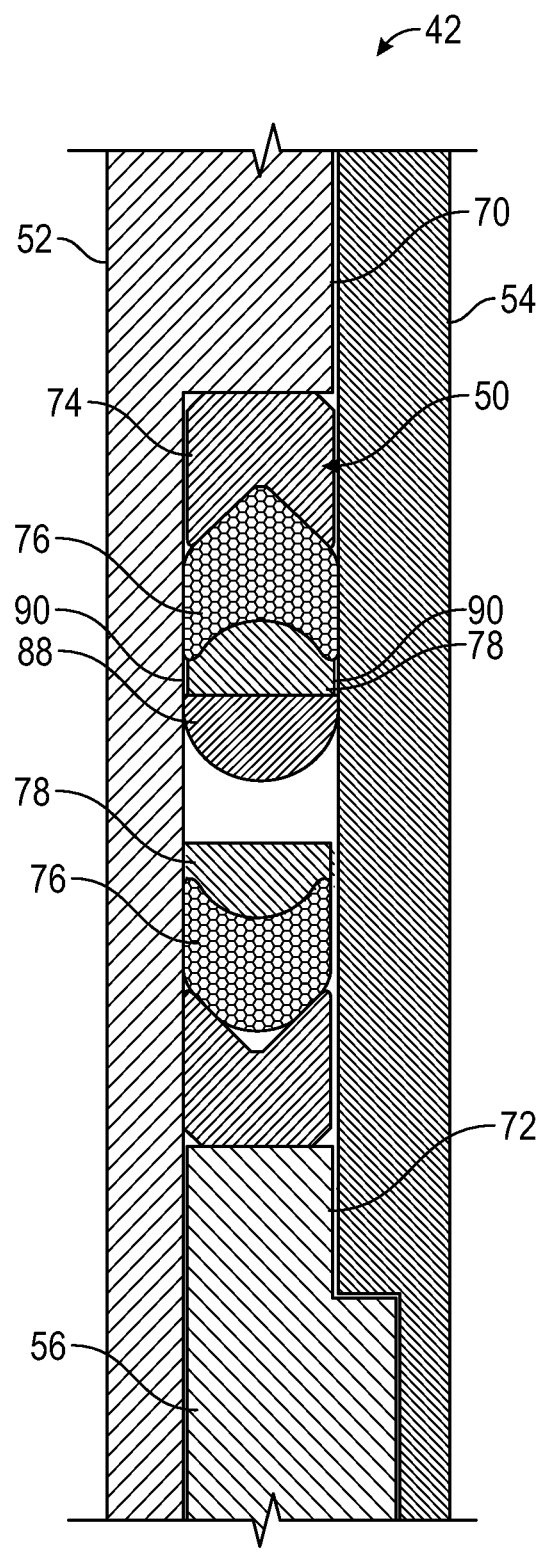

Even though FIGS. 2A and 2B depicts the sealing assembly 50 in a vertical orientation, the sealing assembly 50 may be equally well suited for use in other directional orientations including horizontal and slanted orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure.

Figure 3A:
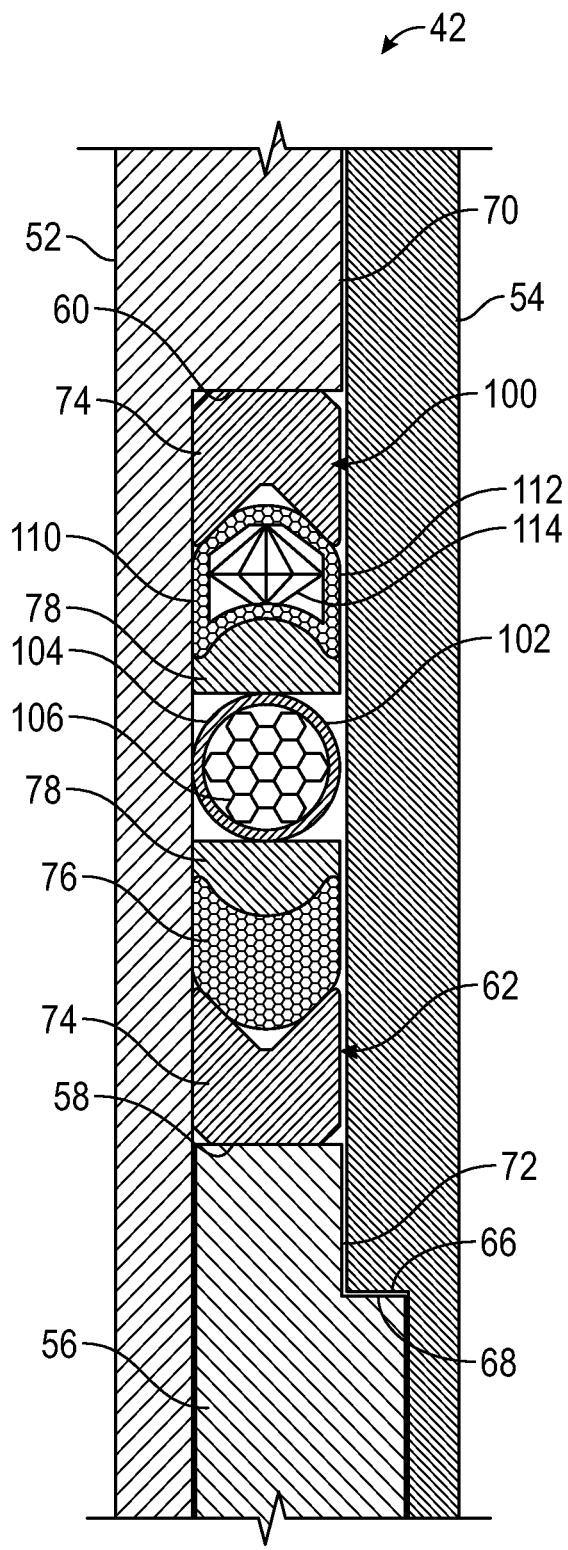
FIGS. 3A and 3B are cross-sectional views of a sealing assembly including an energizing element having an outer elastomeric shroud and an interior lattice structure arranged to mimic the elastic behavior of the elastomeric sealing element of FIGS. 2A and 2B in moving between respective resting and energized configurations.
Figure 3B:
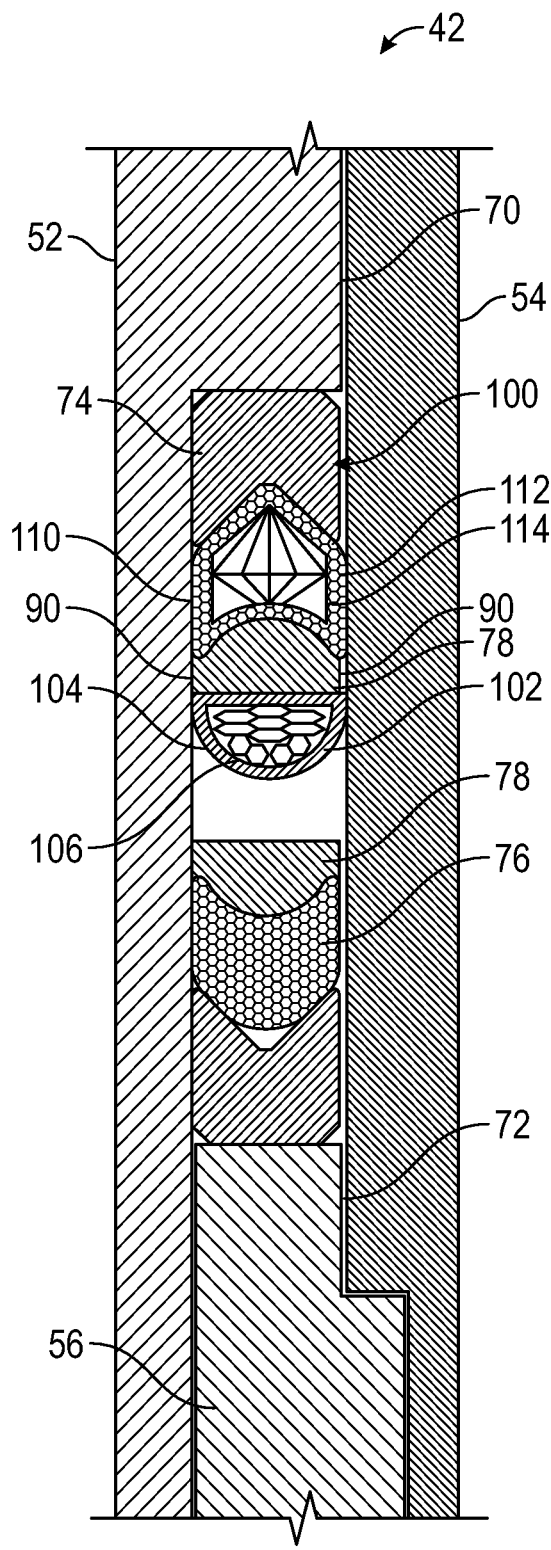

Referring to FIGS. 3A and 3B, the wellbore tool 42 is illustrated with a sealing assembly 100 therein, which provides both chemical stability in the aggressive wellbore environments and resistance to damaged caused by rapid decompression while forming an effective seal between first and second tubular members 52, 54. The sealing assembly 100 may include annular adaptor members 74 and cap rings 78 as described above with reference to FIG. 2A. An energizing element 102 is provided longitudinally between the cap rings 78. The energizing element 102 may exhibit a similar size and exterior geometry in a resting configuration (FIG. 3A) that is similar to the size and geometry of the energizing element 88 in a resting configuration (FIG. 2A) such that the energizing element 102 may be substituted for the energizing element 88 in the wellbore tool 42.

The energizing element 102 may be constructed of an optional outer covering 104 and a lattice structure 106. The outer covering 104 may be constructed of a dense elastomer or any material that facilitates sealing with the first and second tubular members 52, 54. The outer covering 104 could be applied by vapor deposition, additive manufacturing processes, or traditional molding techniques depending on the material selected for the outer covering 104. The lattice structure 106 may be disposed within the outer covering 104 as illustrated or may extend to exterior surfaces of the energizing element 102 in some embodiments. The lattice structure 106 may be constructed of from typical thermoplastic materials such as polphenylene sulfide (PPS), polyetheretherketones such as (PEEK), (PEK) and (PEKK), polytetrafluoroethylene (PTFE) and the like. Examples of suitable thermoplastics suitable for the construction of the lattice structure 106, backup rings 76 or other components of the sealing assembly 50 may include, but are not limited to, polyacetals (e.g., polyoxyethylene and polyoxymethylene), poly(Ci-6 alkyl)acrylates, polyacrylamides, polyamides, (e.g., aliphatic polyamides, polyphthalamides, and polyaramides), polyamideimides, polyanhydrides, polyarylene ethers (e.g., polyphenylene ethers), polyarylene sulfides (e.g., polyphenylene sulfides), polyarylenesulfones (e.g. polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketones, polyethersulfones, polyaryl ether ketones, polyimides (including copolymers such as polyimide-siloxane copolymers), poly(Ci-6 alkyl)methacrylates, polymethacrylamides, polynorbomenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrilebutadiene- styrene (ABS) and methyl methacrylate-butadiene-styrene (MBS)) polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, polylactic acid, polyglycolic acid, poiy-3-hydroxybutyrate, polyhydroxyalkanoate, thermoplastic starch, cellulose ester, silicones, or the like, or a combination including at least one of the foregoing polymers. In some embodiments, the thermoplastic materials may include photopolymers, which may be cured when exposed to light. Photopolymers may permit the lattice structure 106 to have the high strain characteristics of elastomeric materials, while providing the strength and chemical resistance characteristics of thermoplastic or metallic materials. Any of the thermoplastic materials described above for use in the lattice structure 106 and/or backup rings 76 may or may or may not contain filler materials such as graphite, fiberglass, carbon fiber, etc. For example, PEEK as described above may include virgin PEEK or may contain PEEK plus 10% carbon fibers.

The lattice structure 106 may be constructed such that the bulk properties of energizing element 102 mimics the bulk properties of typical elastomeric compounds, e.g., those compounds found in the energizing element 88 (FIG. 2A) described above. The energizing element 102 may exhibit the physical characteristics of elastomeric sealing materials with the chemical and gas damage resistance of the base thermoplastic material. In the activated or energized configuration (FIG. 3B), the lattice structure 106 may be compressed longitudinally and expanded radially within the elastic limits of the thermoplastic material. Thus, the energizing element 102 may not be plastically deformed by the rapid decompression in wellbore operations.

In some embodiments, the backup ring 76 constructed as described above may be provided between the adaptor member 74 and cap ring 78. In some embodiments, a backup ring 110 constructed of an outer covering 112 and lattice structure 114 in a manner similar to the energizing element 102.

Figure 4A:
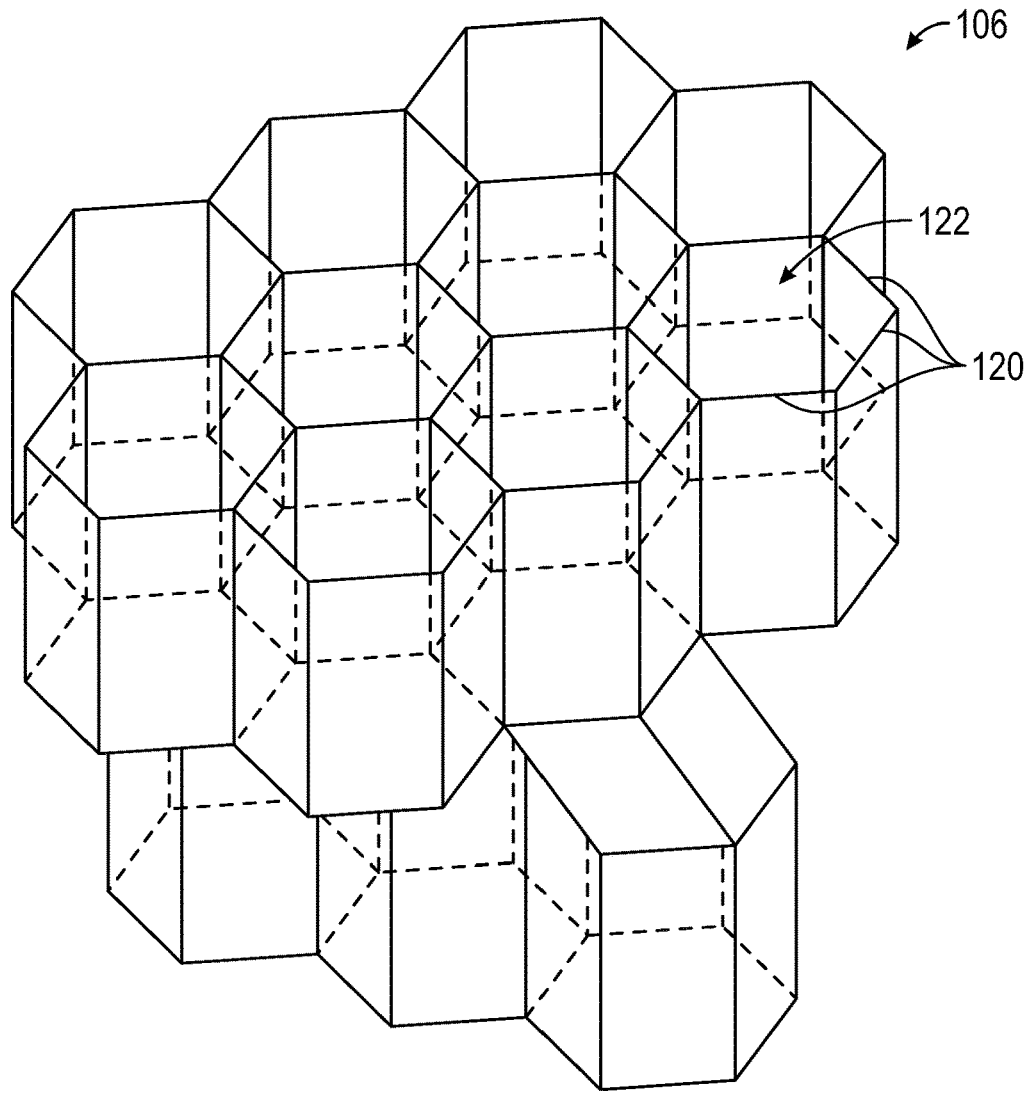
FIGS. 4A through 4C are perspective views of various lattice structures, which may be employed in the sealing assembly of FIGS. 3A and 3B.
Figure 4B:
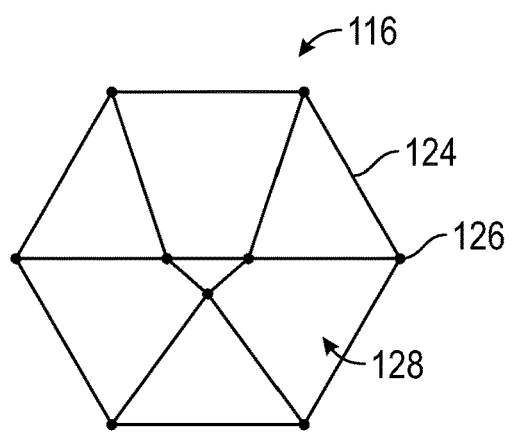
Figure 4C:
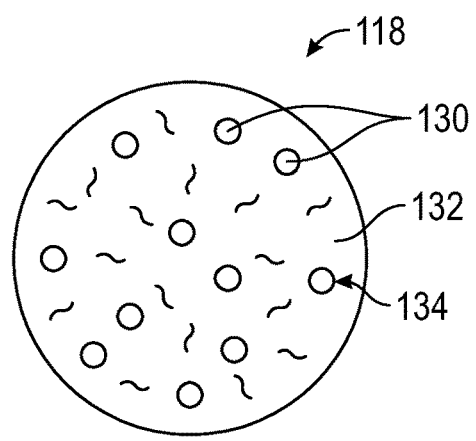

Referring now to FIG. 4A through 4C, lattice structures 106, 116 and 118 may be arranged in various configurations to tailor an energizing element for a specific application. The lattice structure 106 (FIG. 4A) is arranged in a honeycomb structure with walls 120 arranged around hexagonal chambers or voids 122. In operations, the voids 122 provides space for the walls 120 to fold or bend when moved to the activated or energized configuration (FIG. 3B). Lattice structure 116 (FIG. 4B) includes a plurality of slender rods 124 connecting with one another at nodes 126. The nodes 126 may be are arranged to act as hinges between the rods124 such that the rods may pivot through voids 128 existing in the space between the rods 124 and nodes 126. Lattice structures 106 and 116 may be constructed by additive manufacturing processes such that complex geometries may be defined.

Lattice structures 118 (FIG. 4C) may also be constructed by dispersing a filler material 130 within a thermoplastic substrate 132. The filler material 130 may include glass or plastic microspheres that may be collapsed or crushed upon the application of force, e.g., the force applied by a pressure energizing a sealing assembly. The crushing or collapsing of the filler material may permanently reduce the volume of the filler material 130, such as would be the case if the filler material included glass spheres that are broken upon crushing. Upon reduction of the volume of the filler material, voids 134 may be created that provide space for the thermoplastic substrate material to flex under the application of force or pressure. In other embodiments, the filler material may include dissolvable or destructible crystal, e.g., salts, which may be removed from the substrate 132 to generate the voids 134.

Lattice structures may be provided in any three-dimensional structure or geometry depending on any specific needs for isotropic or anisotropic behavior. The lattice structure can be created in any configuration such that the localized strain within the connecting lattice structure remains below the plastic deformation range of the dense thermoplastic material but allows for higher deformations of an energizing element on a bulk scale.

Figure 5:
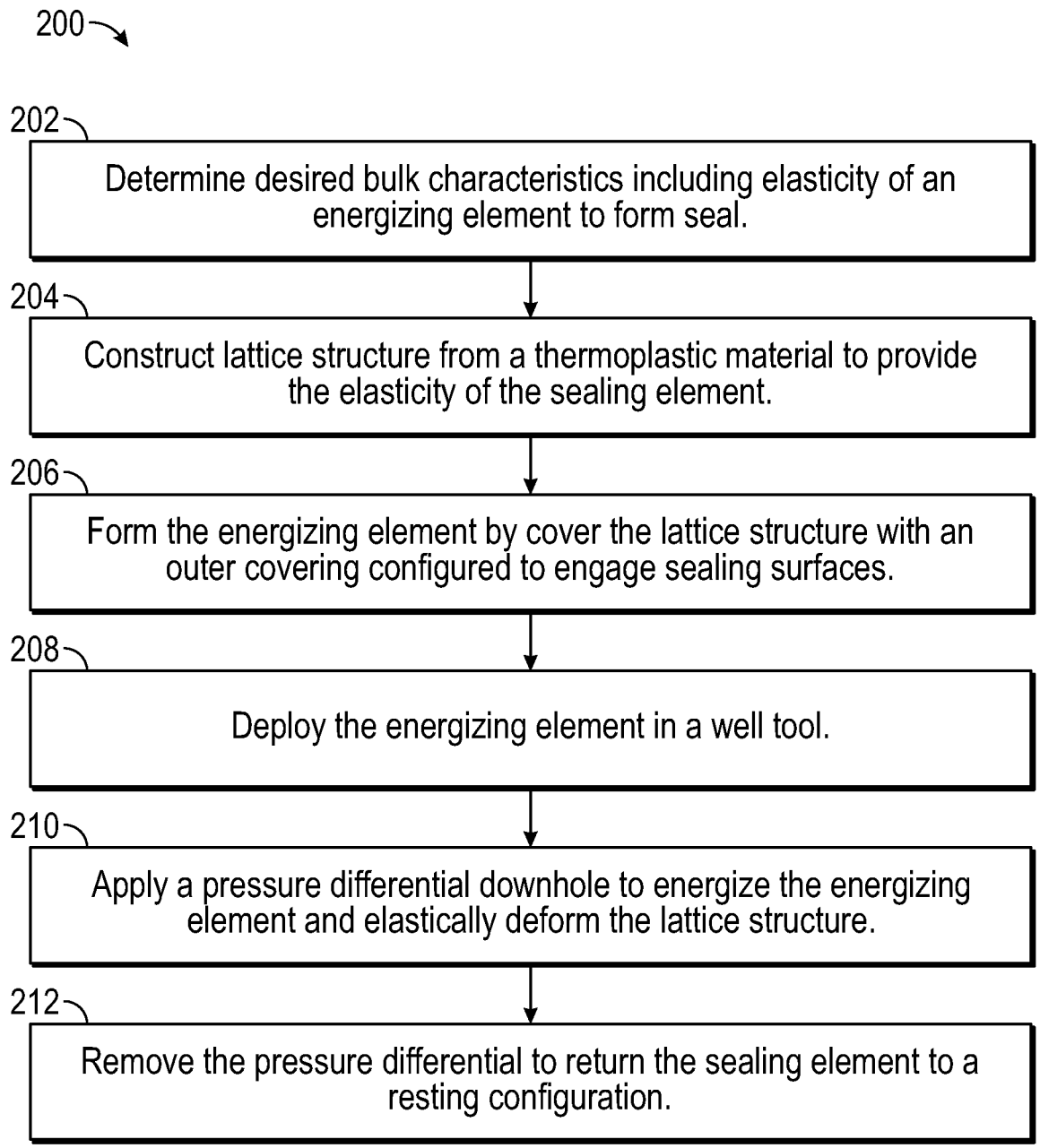
FIG. 5 is a flowchart illustrating an operational procedure for sealing between cooperating components in a wellbore.

Referring to FIG. 5, a procedure 200 is illustrated for generating and employing a seal assembly for a wellbore tool or other downhole application. The procedure begins at step 202 where bulk characteristics of an energizing element are determined for forming a seal. The bulk characteristics may be determined empirically or, in some embodiments by examining an elastomeric energizing element that has failed in operation, e.g., due to chemical exposure in the wellbore. The external geometry and elasticity (e.g., the Young's modulus, bulk modulus, shear modulus) of the seal element that failed may be mimicked with an energizing element that may be such that a replacement energizing element may be constructed in the procedure 200 to take the place of the failed sealing element in a wellbore tool. In other embodiments, the elasticity of a targeted elastomeric material may be determined. For materials with about 50 Shore A hardness to a bot 95 Shoe A hardness, the elasticity of the targeted elastomeric material may be a Young's modulus in the range of about 500 psi to about 8000 psi, a bulk modulus K in the range about 200 kpsi to about 400 kpsi, a shear modulus in the range of about 167 psi to about 2667 psi (about one third of the Young's modulus), or a combination of the these and other characteristics of a targeted elastomeric material.

At step 204, a lattice structure may be constructed from a thermoplastic material to exhibit the bulk characteristics determined in step 202. The lattice structure may be constructed by applying the thermoplastic material in an additive manufacturing processes such as 3-D printing to include a series of voids therein. The voids allow individual thermoplastic members of the lattice structure to pivot and bend internally such that the lattice structure in bulk can exhibit an elasticity greater than any of the individual thermoplastic members. Next, at step 206, an outer covering may be applied around the lattice structure to complete an energizing element.

The outer covering may be applied through vapor deposition, additive manufacturing processes, or traditional molding, and may include materials similar or dissimilar to the materials of the lattice structure to engage sealing surfaces of the wellbore tool.

At step 208, the energizing element may be deployed in a wellbore tool. The energizing element may be installed between first and second members of the wellbore tool along with adaptor members, backup rings and/or end caps, in some embodiments. Where the energizing element is constructed with the outer geometry of an elastomeric energizing element that failed in operation, the energizing element constructed with a thermoplastic lattice structure may simply replace the failed elastomeric energizing element. Once installed in the wellbore tool, the wellbore tool may be conveyed into a wellbore on a conveyance vehicle such as a jointed pipe string.

Once downhole, a pressure differential may be applied across the energizing element in step 210. The pressure may result in a deformation of the lattice structure in which the strain of the lattice structure is maintained within the elastic limits of the thermoplastic materials. At step 212, the pressure differential may be removed to return the sealing element to a resting or undeformed configuration. In some embodiments, either the application or removal of the pressure differential may include rapid decompression of a region in the wellbore that is fluidly coupled to the energizing sealing element. Since plastic deformation of the lattice structure may be limited, the steps 210 and 212 may be repeated for multiple iterations.

Figure 6A:
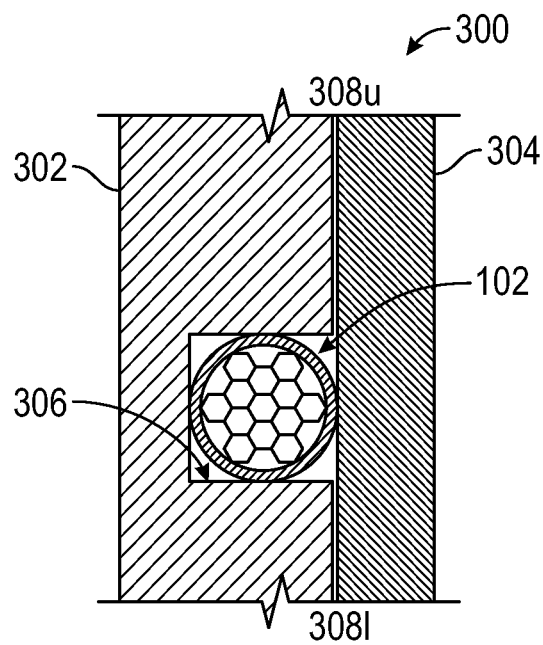
FIGS. 6A through 6D are cross-sectional views of energizing elements arranged to operate independently of backup systems similar to those illustrated in FIGS. 2A and 2B and FIG. 7 is a cross sectional view of an energizing element in the form of a wellbore packer that includes an outer cover and an interior lattice structure.

Referring now to FIGS. 6A through 6D energizing elements may be arranged to operate independently of backup systems such as those illustrated, e.g., FIGS. 2A and 2B. In FIG. 6A, energizing element 102 is arranged in a wellbore tool 300 to seal a clearance gap between a first member 302 and a second member 304 of the wellbore tool 300. An annular groove 306 is defined in the first member 302 to support the energizing element 102. The energizing element 102 operates to prevent the transmission of pressure between an upper region 308u defined above the annular groove 306 and a lower region 3081 defined below the annular groove 306. A sufficient pressure differential between the upper and lower regions 308u, 3091 operates to deform the energizing element 102 to establish a seal against first and second tubular members 302, 304.

Figure 6B:
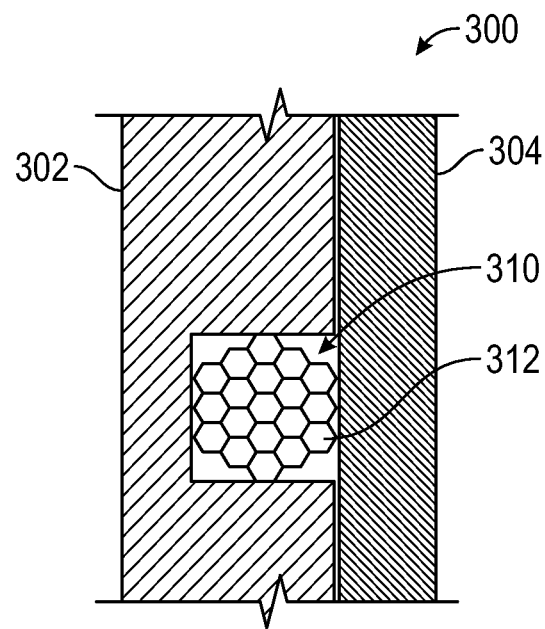

FIG. 6B illustrates an energizing element 310 supported between the first and second members 302, 304 of wellbore tool 300. The energizing element 310 is constructed of a thermoplastic lattice structure 312 and is devoid of a distinct outer cover. The outer geometry of the thermoplastic lattice structure 312 may effectively engage the first and second members 302, 304 directly in some embodiments.

Figure 6C:
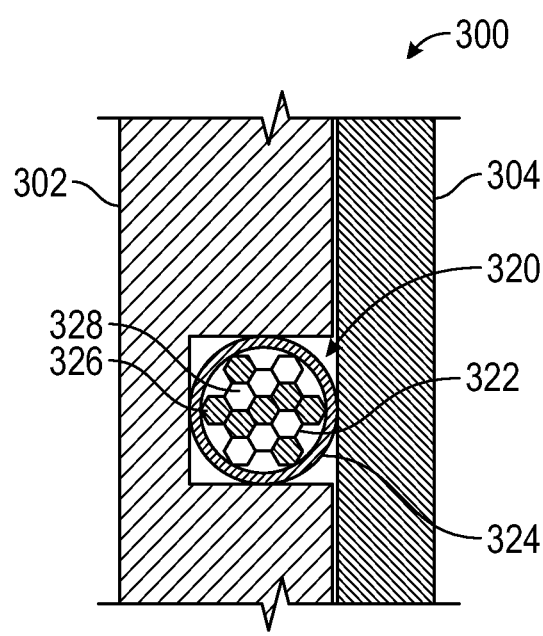

FIG. 6C illustrates an energizing element 320 supported between the first and second members 302, 304 of wellbore tool 300. The energizing element 320 is constructed of a thermoplastic lattice structure 322 and an outer cover 324. The lattice structure 322 includes a plurality of voids 326 that include a filler material therein, and a plurality of voids 328 that are devoid of a filler material. The filler material may be elastomeric, polymeric, etc. An appropriate pattern of voids 326 containing a filler material may facilitate moving the energizing element 320 to a desirable geometry in the energized configuration. In some embodiments, the voids may all be filled with a filler material, and in some embodiments, the voids may all be devoid of a filler material.

Figure 6D:
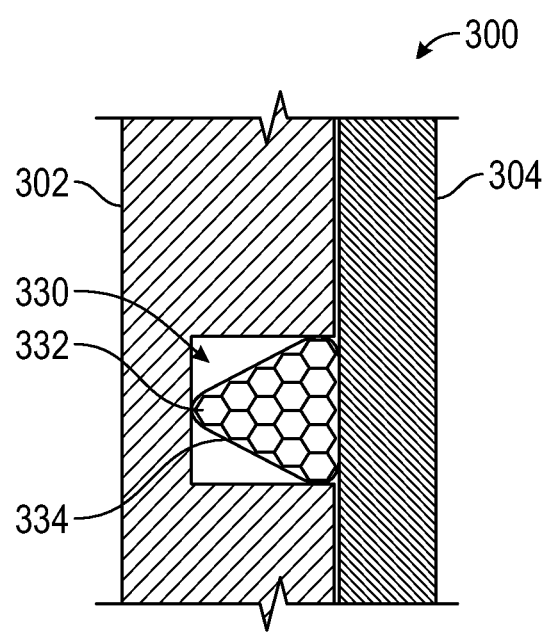

FIG. 6D illustrates an energizing element 330 supported between the first and second members 302, 304 of wellbore tool 300. The energizing element 310 is constructed of a thermoplastic lattice structure 332 and an outer cover 324. The lattice structure 332 and outer cover 324 exhibit a non-circular cross-sectional geometry, even if the overall geometry of the energizing element is ring shaped. The non-circular geometry may provide allow the lattice structure 332 and an outer cover 324 to effectively engage the first and second members 302, 304 in some embodiments, or may facilitate manufacturing in some instances.

Figure 7:
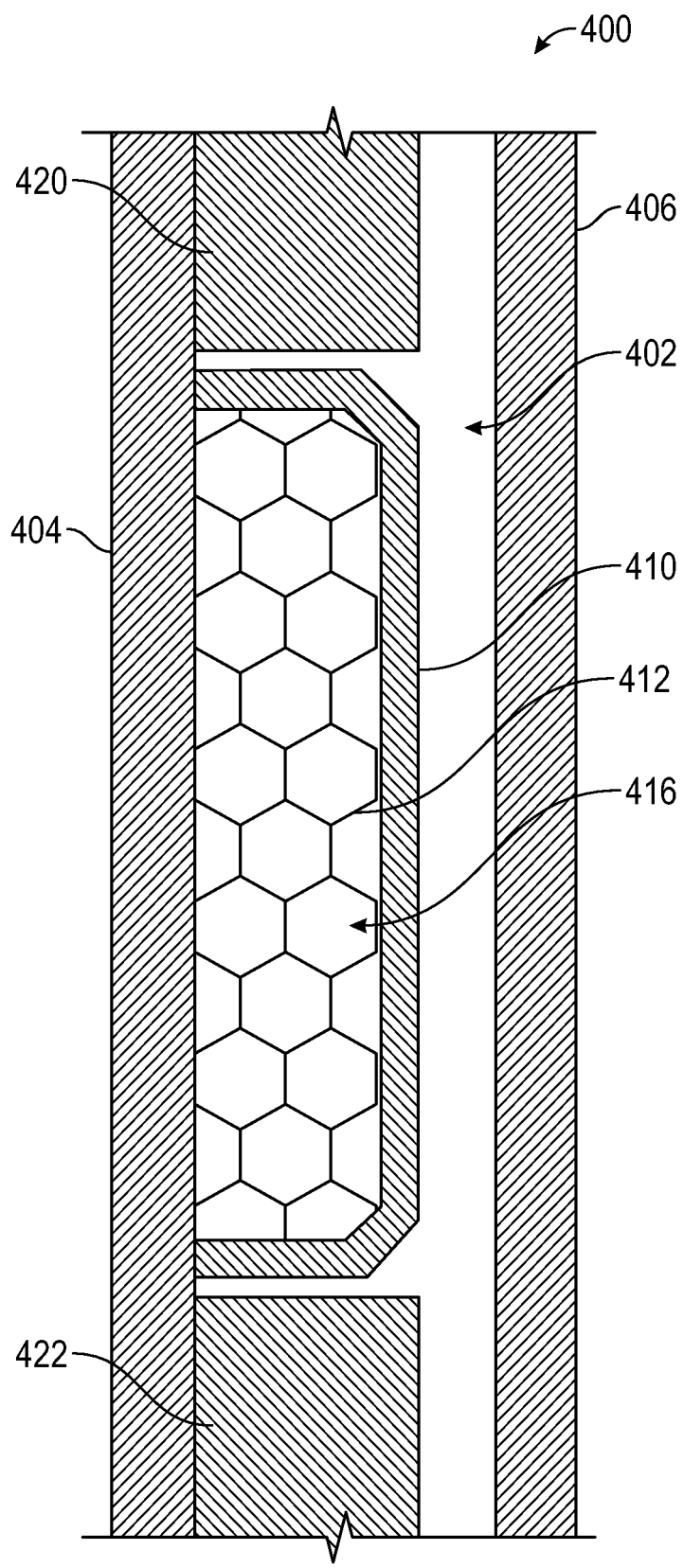

Referring to FIG. 7, a wellbore tool 400 includes an energizing element 402 in the form of a wellbore packer. The energizing element 402 may be carried on a first member 404, e.g., a tubing string, into a second member 406, e.g. a casing string, and may operate to establish a seal between the first and second members 404, 406. The energizing element 402 includes an outer cover 410 and a lattice structure 412. In some embodiments, the outer cover 410 could be constructed of a relatively soft elastomer, e.g., between 30 and 70 on the Durometer scale, and the lattice structure 412 may be arranged to provide the bulk characteristics of a similar or a relatively hard elastomer, e.g., between 60 and 90 on the Durometer scale. The lattice structure 412 may be substantially devoid of elastomeric or filler materials, or may include elastomeric or filler materials disposed in one or more voids 416 defined in the lattice structure.

Energizing element 402 may be activated by applying a pressure differential downhole or by a variety of mechanisms for activating a packer as understood in the art. For example, the energizing element 402 may be mechanically compressed between blocking members 420 and 422, at least one of which may be axially movable along the first element 404. Axially compressing the energizing element 402 may cause the lattice structure to 412 to extend radially outward into a clearance gap 424 such that the outer cover 410 sealingly engages the second member 406.

The lattice structure 412 may thereby exhibit the bulk characteristics of an elastomeric material and mimic the behavior of the elastic material without being susceptible to many of failure mechanisms of the elastomeric material as discussed above. The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

In one aspect, the disclosure is directed to a wellbore tool system. The wellbore system includes a conveyance vehicle extendable to a downhole location in a wellbore and a wellbore tool coupled to the conveyance vehicle and including first and second members separated by a clearance gap. A sealing assembly is disposed between the first and second members and includes an energizing element constructed of a thermoplastic material arranged in a lattice structure. The lattice structure is movable from a resting configuration to an energized configuration in sealing engagement with the first and second members by the application of pressure to the energizing element.

In some embodiments, the energizing element further includes an outer cover disposed around, the outer cover constructed of an elastomeric material. In some example embodiments, the energizing element exhibits an outer geometry and bulk elasticity within a predetermined tolerance of the elastomeric material arranged in the outer geometry of the energizing element. The energizing element may be devoid of an outer covering such that the thermoplastic material defines an outer geometry of the energizing element.

In one or more example embodiments the lattice structure is arranged in a honeycomb structure having walls defining hexagonal voids therebetween. The lattice structure may include a thermoplastic substrate with a plurality filler elements dispersed therein; the filler elements collapsible upon an application of a force applied by a pressure sufficient for energizing the sealing assembly. In some embodiments, the lattice structure includes a plurality of voids defined therein, wherein a first portion of the voids is filled with a filler material and wherein a second portion of the voids is devoid of the filler material.

In some embodiments, the sealing assembly further includes a pair of backup rings on opposing sides of the energizing element. The energizing element is substantially ring shaped with a circular cross-section.

According to another aspect, the disclosure is directed to a method of establishing a seal between first and second members in a wellbore. The method includes determining the bulk characteristics of an energizing element to form the seal. The bulk characteristics include at least an outer geometry and an elasticity. The method further includes constructing the energizing element to include a lattice structure formed from a thermoplastic material to exhibit the elasticity within a predetermined tolerance. The energizing element is deployed to a downhole location within the wellbore, and a the energizing element is elastically deformed sealingly engaging the first and second members.

In one or more example embodiments, constructing the energizing element further includes forming an outer cover around an exterior of the lattice structure, the outer cover constructed of a polymeric material or an elastomeric material. Constructing the energizing element may include an additive manufacturing process to form the lattice structure. In some embodiments, constructing the energizing element includes dispersing a plurality of collapsible filler elements in a thermoplastic substrate, wherein the filler elements are collapsible upon applying the pressure differential. Constructing the energizing element may include dispersing a plurality of dissolvable filler elements in a thermoplastic substrate, and dissolving the filler elements to create voids in the substrate to thereby form the lattice structure.

In some embodiments, constructing the energizing element includes forming a plurality of voids in the lattice structure, inserting a filler material into a first portion of the plurality of voids and maintaining a second portion of the voids devoid of the filler material. The method may further include assembling the energizing element into a sealing assembly including at least one backup ring in operative engagement with the energizing element. In some embodiments, the method further includes removing the pressure differential to return the energizing element to a resting configuration in the wellbore.

According to still another aspect, the disclosure is directed to an energizing element for use in a wellbore tool.

The energizing element includes a lattice structure formed of a thermoplastic material, and an outer cover disposed around an outer geometry of the lattice structure. The lattice structure arranged to include a plurality of voids therein devoid of filler material such that the lattice structure exhibits a bulk elasticity within a predetermined tolerance of a targeted elastomeric material. The outer covering is constructed of at least one of the targeted elastomeric material, a different elastomeric and a polymeric material.

In some embodiments, the lattice structure is arranged in a honeycomb structure having walls defining hexagonal voids therebetween. The energizing element may be constructed as an o-ring with a generally circular cross section.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A wellbore tool system, comprising:
   a conveyance vehicle extendable to a downhole location in a wellbore;
   a wellbore tool coupled to the conveyance vehicle and including first and second members separated by a clearance gap; and
   a sealing assembly disposed between the first and second members, the sealing assembly including an energizing element constructed of a thermoplastic material arranged in a lattice structure including a plurality of voids defined therein such that the energizing element exhibits a bulk elasticity of an elastomeric material, wherein the lattice structure is movable from a resting configuration to an energized configuration in sealing engagement with the first and second members by an application of pressure to the energizing element.

2. The wellbore tool system according to claim 1, wherein the energizing element further comprises an outer cover disposed therearound, the outer cover constructed of the elastomeric material.

3. The wellbore tool system according to claim 2, wherein the energizing element exhibits an outer geometry and the bulk elasticity within a predetermined tolerance of the elastomeric material arranged in the outer geometry of the energizing element.

4. The wellbore tool system according to claim 1, wherein the energizing element is devoid of an outer covering such that the thermoplastic material defines an outer geometry of the energizing element.

5. The wellbore tool system according to claim 1, wherein the lattice structure is arranged in a honeycomb structure having walls defining hexagonal voids therebetween.

6. The wellbore tool system according to claim 1, wherein the lattice structure is constructed via a thermoplastic substrate with a plurality of filler elements dispersed therein, the filler elements collapsible upon an application of a force applied by a pressure sufficient for energizing the sealing assembly, and wherein the filler elements include one or more glass spheres.

7. The wellbore tool system according to claim 1, wherein a first portion of the plurality of voids is filled with a filler material and wherein a second portion of the plurality of voids is devoid of the filler material.

8. The wellbore tool system according to claim 1, wherein the sealing assembly further comprises a pair of backup rings on opposing sides of the energizing element.

9. The wellbore tool system according to claim 1, wherein the energizing element is substantially ring shaped with a circular cross-section.

10. A method of establishing a seal between first and second members in a wellbore, the method comprising:
    determining bulk characteristics of an energizing element to form the seal, the bulk characteristics including at least an outer geometry and an elasticity of an elastomeric material;
    constructing the energizing element to include a lattice structure having a plurality of voids defined therein, the lattice structure formed from a thermoplastic material to exhibit the elasticity of the elastomeric material within a predetermined tolerance;
    deploying the energizing element to a downhole location within the wellbore; and
    applying a pressure downhole to create a pressure differential, wherein the pressure differential is to elastically deform the energizing element and thereby sealingly engage the first and second members.

11. The method according to claim 10, wherein constructing the energizing element further comprises forming an outer cover around an exterior of the lattice structure, the outer cover constructed of a polymeric material or an elastomeric material.

12. The method according to claim 10, wherein constructing the energizing element includes an additive manufacturing process to form the lattice structure.

13. The method according to claim 10, wherein constructing the energizing element includes dispersing a plurality of collapsible filler elements in a thermoplastic substrate, wherein the filler elements are collapsible upon applying the pressure differential.

14. The method according to claim 10, wherein the constructing the energizing element includes dispersing a plurality of dissolvable filler elements in a thermoplastic substrate, and dissolving the filler elements to create the plurality of voids in the thermoplastic substrate to thereby form the lattice structure.

15. The method according to claim 10, wherein constructing the energizing element includes forming the plurality of voids in the lattice structure, inserting a filler material into a first portion of the plurality of voids and maintaining a second portion of the voids devoid of the filler material.

16. The method according to claim 10, further comprising assembling the energizing element into a sealing assembly including at least one backup ring in operative engagement with the energizing element.

17. The method according to claim 10, further comprising removing the pressure to return the energizing element to a resting configuration in the wellbore.

18. An energizing element for use in a wellbore tool, the energizing element comprising;
    a lattice structure formed of a thermoplastic material, the lattice structure arranged to include a plurality of voids therein devoid of filler material such that the lattice structure exhibits a bulk elasticity within a predetermined tolerance of a targeted elastomeric material, wherein the energizing element is configured to form a seal in the wellbore tool; and
    an outer covering disposed around an outer geometry of the lattice structure, the outer covering constructed of at least one of the group consisting of the thermoplastic material of the lattice structure, a different thermoplastic material, the targeted elastomeric material, a different elastomeric and a polymeric material.

19. The energizing element according to claim 18, wherein the lattice structure is arranged in a honeycomb structure having walls defining hexagonal voids therebetween.

20. The energizing element according to claim 18, wherein the energizing element is constructed as an O-ring with a generally circular cross section.

\* \* \* \* \*